United States Patent [19]

Wolfe et al.

[11] Patent Number: 4,796,579
[45] Date of Patent: Jan. 10, 1989

[54] AUTOMOTIVE TYPE THROTTLE BODY

[75] Inventors: Brian C. Wolfe, Canton; Thomas D. Wernholm, Northville, both of Mich.

[73] Assignee: Ford Motor Company, Dearborn, Mich.

[21] Appl. No.: 162,844

[22] Filed: Mar. 2, 1988

[51] Int. Cl.⁴ .............................................. F02M 7/12
[52] U.S. Cl. ..................................... 123/336; 123/479; 123/399; 123/400; 123/442
[58] Field of Search ............... 123/336, 478, 479, 399, 123/400, 442; 261/44 E, 44 F, 65

[56] References Cited

U.S. PATENT DOCUMENTS

| | | | |
|---|---|---|---|
| 3,502,167 | 3/1970 | Baxter et al. | 123/336 |
| 3,561,409 | 2/1971 | August | 123/336 |
| 4,335,689 | 6/1982 | Abe et al. | 123/336 |
| 4,424,785 | 1/1984 | Ishida et al. | 123/479 |
| 4,452,218 | 6/1984 | Yokoyama et al. | 123/336 |
| 4,484,551 | 11/1984 | Choma et al. | 123/336 |

Primary Examiner—Raymond A. Nelli
Attorney, Agent, or Firm—Robert E. McCollum; Clifford L. Sadler

[57] ABSTRACT

An automotive type internal combustion engine has an air throttle body for providing air to the engine for combination with fuel injected to define a fuel air charge; the air throttle body having primary and secondary air passages controlled by throttling valves, the primary passage being a drive-by-wire electrical system in which the throttle valve is moved electrically in response to movement of the vehicle accelerator pedal, the secondary passage being controlled by a throttle valve that has a direct mechanical connection to the vehicle accelerator pedal to be operative at wide open or near wide open throttle positions of the accelerator pedal to not only supply additional air for wide open throttle operation, but also to supply sufficient air to sustain engine operation in the event of inoperativeness of the electrical system or the actuator/motor affecting movement of the primary throttle valve.

7 Claims, 2 Drawing Sheets

AUTOMOTIVE TYPE THROTTLE BODY

This invention relates in general to an air throttle body for an automotive type engine. More particularly, it relates to one having primary and secondary air flow passages, the primary passage being controlled indirectly from the vehicle accelerator pedal by an electrical drive-by-wire type connection thereto, the secondary passage being directly connected to the accelerator pedal for a positive mechanical opening of the secondary passage either to supply additional air flow to the engine when called for, or, alternatively, to supply enough air flow to sustain engine operation in the event of the primary passage becoming closed or in its idle speed position for any reason.

The primary throttle valve of the invention is used to perform all of the drive-by-wire throttle body functions; that is, a microprocessor would receive a number of input signals from various parts of the engine to indicate certain operating parameters of the engine, such as temperature, pressure, vehicle speed, etc. These signals would be transformed into an output signal to the primary throttle valve actuator to position the latter throttle valve as a function of depression of the accelerator pedal and the engine parameters to provide the proper air flow to the engine.

The secondary throttle valve is cable connected directly to the accelerator pedal and used both to provide wide open throttle air flow, as well as to function in the event of inoperativeness of the primary throttle valve actuator to keep the engine running. The secondary throttle valve is mechanically connected to the accelerator pedal and remains closed until near wide open throttle conditions are called for. If the primary valve actuator becomes inoperative, it is designed to automatically return the primary throttle valve to the engine idle speed or minimum air flow position.

In summary, therefore, the air throttle body of the invention incorporates a pair of parallel air flow passages, each having throttle valve means separately controlled to control air flow, the primary valve means being controlled electrically by a drive-by-wire system linking the accelerator pedal and throttle valve to a microprocessor or similar device, the secondary throttle valve being connected directly to the vehicle accelerator pedal by mechanical means and actuated when the accelerator pedal nears wide open throttle position to provide needed additional air flow to the engine or to provide enough air flow to the engine to sustain operation in the event of the inoperativeness of the primary system.

Drive-by-wire systems for controlling air flow through throttle bodies for automotive type engines are known. For example, U.S. Pat. No. 4,424,785, Ishida et al, shows in FIG. 1 main and auxiliary flow circuits for supplying air past fuel injectors 4 and 5 to the engine combustion chamber. The auxiliary throttle valve 3 operates only when the main control 2 becomes inoperative. At the same time, the auxiliary fuel injector 5 becomes operative to the exclusion of main injector 4. However, both main and auxiliary units are connected electrically to the accelerator pedal through the control units 10 and 11 and the potentiometer 8 and 18. This device uses the secondary or auxiliary throttle valve merely as a back-up and not as an independent additional supply of air to the engine for higher speed operation or for operation in the event of inoperativeness of the main system.

U.S. Pat. No. 4,484,551, Choma et al, shows a drive-by-wire throttle body containing one induction passage with two throttle valves, one being larger than the other. The larger throttle valve has a minimum slightly open position and is connected directly to the vehicle accelerator pedal. It is provided primarily for assuring closing of the throttle body induction passage a predetermined degree in the event that the electrically driven main throttle valve 22 remains in an open position due to inoperativeness of its actuator. There are no two separate induction passages for air flow independently to the engine, as in this invention, with one being controlled by a drive-by-wire control system, and a secondary passage linked directly and mechanically to the vehicle accelerator pedal for additional air flow at higher speeds or to provide enough engine air flow to sustain engine operation in the event of inoperativeness of the primary system.

It is, therefore, a primary object of the invention to provide an automotive type air throttle body having primary and secondary air flow induction passages wherein the primary air flow passage is drive-by-wire controlled with its throttle valve controlled electrically for movement in response to signals from a microprocessor or similar device operatively connected to the vehicle accelerator pedal and sensing predetermined engine operating parameters to automatically position the throttle valve for the main flow of air to the engine, the secondary passage being controlled by a throttle valve linked directly to the vehicle accelerator pedal by mechanical means to be opened mechanically near engine wide open throttle position of the accelerator pedal to provide either additional air to the engine for power purposes, or to provide enough air to sustain engine operation in the event the primary system becomes inoperative for any reason.

Other objects, features and advantages of the invention will become more apparent upon reference to the succeeding, detailed description thereof, and to the drawings illustrating the preferred embodiments thereof; wherein.

Figure 1:
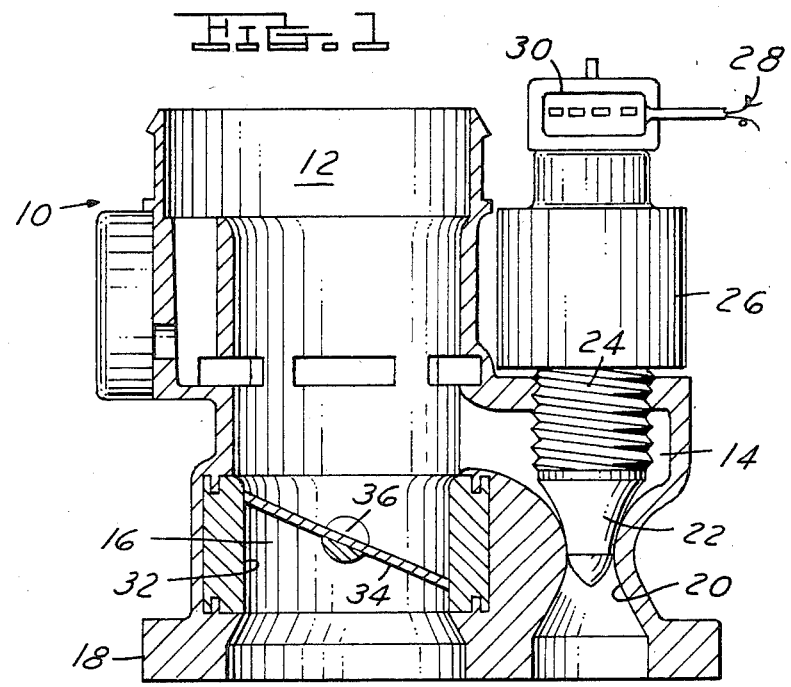
FIG. 1 illustrates schematically a cross-sectional view of an automotive type throttle body embodying the invention.

FIG. 1 shows an air throttle body 10 of the downdraft type. It has a main annular air induction passage 12 that is common to a pair of independent parallel branch air passages or throttle bores 14 and 16. Passage 14 is a primary air induction passage that is used to supply air to the engine during engine idle and part throttle speed operations. Passage 16 is a secondary air induction passage that is normally closed and opened only when the engine approaches wide open throttle position to supply needed additional air to the engine for a power operation. It is also used to supply the necessary air to maintain engine operation in the event that the primary induction passage 14 becomes inoperative for any reason. This will be explained in more detail later.

The induction passage 12 is shown open at its upper end to ambient air. Conventionally, it would be connected to the clean air side of a known type of dry element or similar type air cleaner. The lower portion of the air throttle body 10 is shown flanged at 18 for mounting over the intake manifold of the engine to which it is to be attached. This subjects the air induction passages to the varying manifold vacuum of the engine to vary the air flow volume through the air throttle body in a known manner.

The primary induction passage 14 is shown as having a fixed area venturi 20 within which is vertically slidably mounted a conical-like pintle or plug type throttle valve 22. The latter is axially slidable, as seen in FIG. 1, to vary the cross-sectional air flow area between the pintle and the walls of the throttle body defining the venturi. The upper end 24 of the pintle 22 would be connected to the armature of an electrical actuator/motor indicated in general at 26. The latter would be connected electrically by wiring 28 to a microprocessor or similar computer-like device (not shown).

The pintle or plug 22, in this case, is driven by a drive-by-wire system; i.e., it would be electrically connected by wiring, not shown, to the vehicle accelerator pedal so that upon depression of the pedal a signal would be sent to the microprocessor that in turn would control the voltage flow to the electrical actuator/motor 26 in a manner to position the pintle for the desired amount of air flow for the amount of fuel called for. A throttle valve/pintle position sensor 30 would receive feedback signals as to the position of the pintle, which then would cause actuator/motor 26 to reposition the pintle/throttle valve to provide the correct amount of air flow to be delivered to the engine proper in proportion to the volume of air passing through the primary induction passage 14. The actuator/motor 26 in this case could be a DC electrical actuator, for example, or a stepper motor, and would be programmed to move the pintle 22 to the closed throttle position shown in the event the actuator/motor or electrical system becomes inoperative.

As stated previously, the secondary induction passage 16 normally is used only to supply additional air when the vehicle accelerator pedal nears wide-open throttle position. Alternatively, in this case, it is used to supply the necessary air to the engine to maintain operation in the event that the primary induction passage 14 becomes closed due to an inoperative electrical actuator 26 or failure of the electrical system.

More specifically, induction passage 16 contains a fixed area venturi 32 within which is mounted a butterfly type throttle valve or plate 34. The latter is fixed to a shaft 36 rotatably mounted in the walls of the throttle body 10. The throttle valve or plate 34 is spring biased to a closed position and will move from the position shown closing passage 16 to a near vertical wide-open throttle position. The movement of the throttle valve is accomplished mechanically by a direct mechanical connection to the vehicle accelerator pedal, shown more clearly in FIG. 2.

Figure 2:
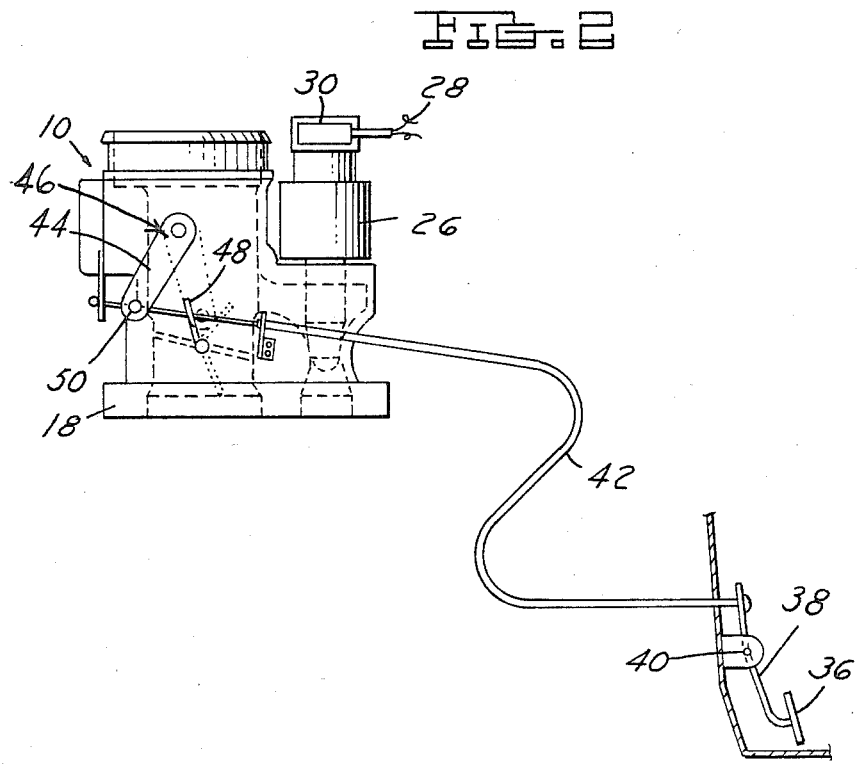
FIG. 2 illustrates schematically a view of the throttle body of FIG. 1 with a connection therefrom to the vehicle accelerator pedal.

More specifically, FIG. 2 shows a conventional vehicle accelerator pedal 36 pivotally mounted to a lever 38 fulcrumed on the engine floor board at 40. At its upper end, lever 38 is connected to a Bowden wire type cable 42 that passes through the floor board to a point near the throttle valve 34. At that point, the cable has a universal connection to the lower end 44 of a lever 46 that is pivotally mounted to air throttle body 10.

Fixedly secured to throttle valve shaft 36 is a second finger-like lever 48 that has essentially a yoke-like shape, not shown. The lever 48 is adapted to project vertically a distance sufficient to receive cable 42 through the yoke of the lever in a manner to intercept the movement of the lever 46. The lever 46 carries a pin or shaft 50 that extends at right angles to the longitudinal axis of lever 46. The pin or shaft 50 is so located with respect to lever 48 as to engage the lever 48 and rotate the same and throttle valve shaft 36 upon depression of the accelerator pedal 38 to an engine wide open throttle position. This position is indicated in FIG. 2 by the dotted lines showing arcuate pivoting of the throttle valve 34 by movement of lever 46 when the accelerator pedal is depressed to the wide open throttle position. This assures a mechanical opening of the secondary throttle valve 34 by the direct connection in one direction of movement to the accelerator pedal. Therefore, in the event that the primary induction passage 20 becomes closed for any reason, air flow to the engine can be maintained simply by full depression of the accelerator pedal 36 to open the secondary air passage 16.

It also will be clear that the described connections provide a lost motion type connection between the accelerator pedal and throttle valve 34 when the pedal 36 is depressed less than to the wide open position, or when the pedal is released to the idle speed position. In this case, the cable 42 will simply move through the yoke opening of lever 48 without moving the throttle valve 34 due to lever 46 moving away from lever 48.

Figure 3:
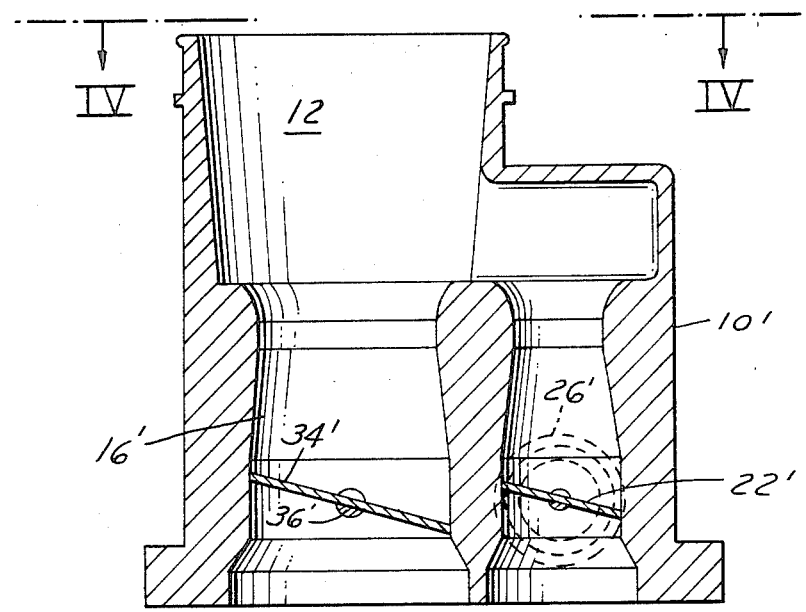
FIG. 3 is a view similar to FIG. 1 illustrating an alternative or modified embodiment.
Figure 4:
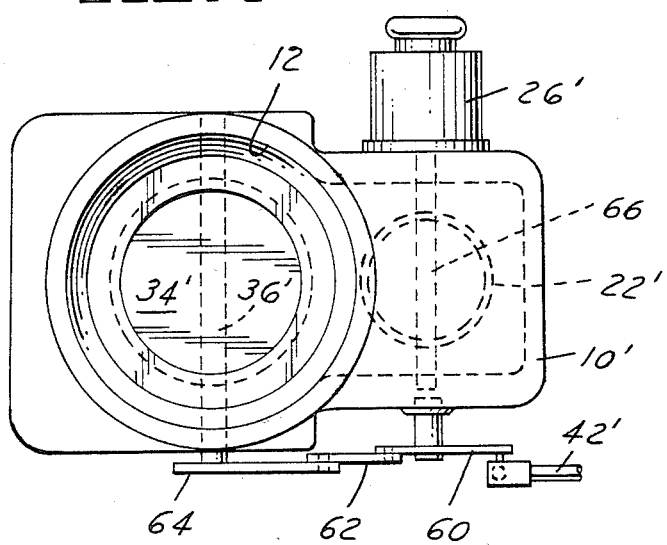
FIG. 4 is a cross-sectional view taken on a plane indicated by and viewed in the direction of the arrows IV—IV of FIG. 3.

FIGS. 3 and 4 show an alternative embodiment in which the axially movable pintle 22 of FIG. 1 is replaced by the butterfly-type throttle valve 22'. In all other respects, the operation is essentially the same as that shown and described in connection with FIGS. 1 and 2. That is, the butterfly valve 22' would be actuated by a electrical actuator 26' in the same manner as described in connection with the previous figures. Again, if the electrical system or electrical actuator becomes inoperative for any reason, the butterfly valve 22' would assume the closed or engine idle speed position shown. However, air flow would still be maintained to the engine by a full depression of the vehicle accelerator pedal opening the secondary air induction passage 16' by rotating the secondary throttle valve 34' to a more vertical position.

FIG. 4 shows a portion of the mechanical attachment of the Bowden wire cable 42' from the vehicle accelerator pedal, not shown, to the secondary passage butterfly valve 34'. It consists of a number of interconnected levers 60, 62 and 64, lever 60 being pivoted to the end of the Bowden wire cable 42', and the lever 64 being fixed to the shaft 36' of butterfly valve 34'. The lever 62 would be interconnected to levers 60 and 64 with a lost motion arrangement so that it would not be actuated until the accelerator pedal was depressed fully to a wide open or near wide open throttle position. As seen, the lever 60 would be pivotally mounted to the air throttle body 10', and the primary air induction passage throttle valve 22' would be fixed to a shaft 66 mounted in the throttle body 10' for an independent rotation relative to lever 60.

The operation is believed to be clear from the above description and consideration of the drawings and, therefore, will not be given in detail. Briefly, depression of the vehicle accelerator pedal 36 by the vehicle operator from the engine idle speed position shown will cause an electrical signal to be sent to the electrical actuator 26 in FIG. 1 or 26' in FIG. 4. This will move the pintle 22 vertically from the position shown to permit air flow through induction passage 12 and primary induction passage 20 to the engine intake manifold. Further depression of pedal 16 will cause an increased vertical movement of pintle 22 to increase the air flow proportionally. For wide open throttle operation, the pedal 36 will be depressed its full extent to mechanically open the secondary throttle valve 34 by the lever 46 in FIG. 2 moving rightwardly to contact the lever 48 and pivot the same clockwise thereby pivoting the secondary throttle valve 34 clockwise to an open position. Air flow will then be through both the primary and secondary passages to provide the volume of air for combination with the fuel to provide the power desired at this time.

At any time, if the electrical system or the electrical actuator should become inoperative for any reason, air flow to the engine will still be maintained to assure a continued operation of the engine, upon a near full depression of the accelerator pedal 36. This will mechanically move lever 46 to move lever 48 to move the secondary throttle valve 34 to an open position to supply enough air to the engine for combination with the fuel to sustain operation.

From the above, it will be seen that the invention provides an air throttle body having a pair of air passages for supplying the correct amount of air to the engine during all operative phases of the engine. It will also be seen that it provides additional means to assure operation of the engine in the event that one of the passages becomes inoperative for any reason, this additional means providing a direct mechanical connection from the vehicle accelerator pedal to a throttle valve to open the same at any time to maintain a necessary flow volume of air to the engine.

While the invention has been shown and described in its preferred embodiments, it will be clear to those skilled in the arts to which it pertains that many changes and modifications may be made thereto without departing from the scope of the invention.

We claim:

1. A multi-stage throttle body having parallel primary and secondary throttle bores defining air flow induction passages each open to ambient air at one end and adapted to be connected to an engine intake manifold at the other end for providing two independent passages of air to the engine, said primary and secondary passages each having throttle valve means therein movable between positions opening and closing the respective passages to control air flow therethrough, a drive-by-wire electrical actuator means for moving the primary throttle valve means, an operator controlled vehicle accelerator pedal electrically connected to the primary throttle valve means and mechanically connected directly to the secondary throttle valve means and depressible for effecting movement of the primary throttle valve means by the drive-by-wire means and for positively moving the secondary throttle valve means at times, and lost motion means in the connection between the accelerator pedal and secondary throttle valve means effecting movement of the secondary throttle valve means only after a predetermined depression of the accelerator pedal.

2. A throttle body as in claim 1, wherein the predetermined depression of the accelerator pedal is essentially a maximum depression.

3. A throttle body as in claim 1, wherein the primary induction passage includes a venturi and the throttle valve means includes a conical-like plug movable into and out of the venturi to close or open the same.

4. A throttle body as in claim 3, wherein the means for moving one of the throttle valve means is a stepper motor.

5. A throttle body as in claim 4, wherein the electrical actuator has an inoperative position in which the primary throttle valve means is at a minimum air flow engine idle speed condition.

6. A throttle body as in claim 1, the primary passage containing a venturi, the primary passage throttle valve means comprising a conical-like plug axially movable into and out of the venturi from an engine idle speed minimum air flow position to a maximum air flow essentially wide open position, and a electrical actuator connected to said plug to move the same, the electrical actuator having an inoperative position moving the plug to the idle speed position, the lost motion means maintaining the secondary throttle valve means closed until the accelerator pedal is depressed to essentially a wide open throttle position, whereupon the secondary throttle valve means is opened regardless of the position of the primary throttle valve means to maintain a supply of air to the engine.

7. A throttle body as in claims 1 or 6, wherein the lost motion means consists of a cable connected at one end to the accelerator pedal and at its other end to a lever pivotally mounted adjacent the secondary throttle valve means, the secondary throttle valve means being in the path of movement of the lever to be contacted and moved thereby to an open position after the predetermined depression of the accelerator pedal.

* * * * *